United States Patent [19]

Ishida

[11] 4,044,866

[45] Aug. 30, 1977

[54] METHOD FOR FILLING GAS INTO GAS SPRING

[75] Inventor: Kunio Ishida, Yokohama, Japan

[73] Assignee: Tokico Ltd., Japan

[21] Appl. No.: 750,719

[22] Filed: Dec. 15, 1976

[30] Foreign Application Priority Data

Mar. 19, 1976 Japan ................................ 51-30448

[51] Int. Cl.² .............................................. F16F 9/43
[52] U.S. Cl. .................................. 188/322; 188/352; 267/64 R
[58] Field of Search ............... 188/266, 311, 312, 313, 188/322, 352; 267/64 A, 64 R

[56] References Cited

U.S. PATENT DOCUMENTS

| 3,185,262 | 5/1965 | Axthammer | 188/322 X |
| 3,197,191 | 7/1965 | Axthammer | 188/311 X |
| 3,957,259 | 5/1976 | Peddinghaus | 267/64 R |

*Primary Examiner*—Duane A. Reger
*Attorney, Agent, or Firm*—Wenderoth, Lind & Ponack

[57] ABSTRACT

A method for filling gas into a cylindrical container having a rod slidably extending from one end thereof. The method comprises forming passage means in the rod at a position adjacent to the inner end thereof, projecting the rod outwardly to its maximum extending position so as to form a gas filling passage by said passage means across an annular seal member which normally engages the rod sealingly and slidably, filling high pressure gas into the container through the gas filling passage, and moving the rod inwardly relative to the seal member to close the gas filling passage.

6 Claims, 5 Drawing Figures

Fig. 2
Fig. 3
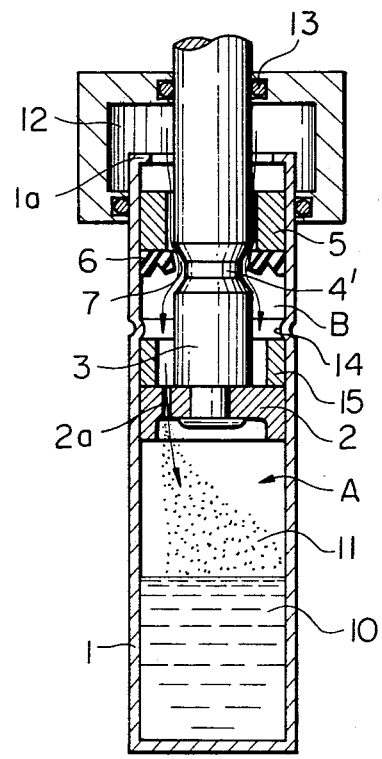
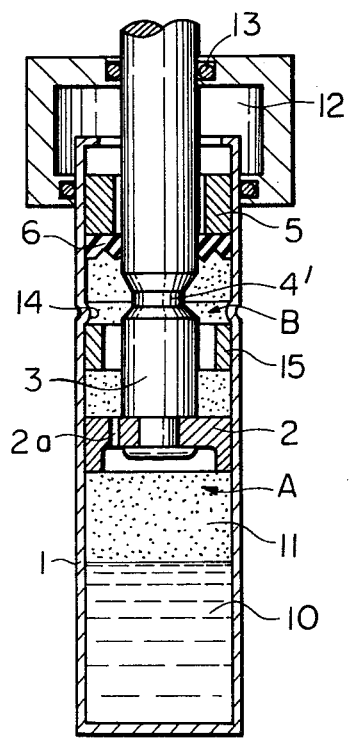

METHOD FOR FILLING GAS INTO GAS SPRING

This invention relates to a method for filling gas into a cylindrical container such as an oleo-pneumatic shock absorber or a gas spring containing high pressure gas therein and having a rod movably projecting from one end of the container, and to the container containing high pressure gas therein.

One of prior art methods for filling high pressure gas into the cylindrical container of the aforesaid type consists of forming a reduced diameter portion in the rod projecting outwardly from the container at a position remote from a piston slidably disposed in the container and connected to the rod, forming a passage between the reduced diameter portion and a seal sealing the rod by retracting the rod into the container by an amount exceeding the normal retracted position, filling gas into the container through the passage, and thereafter closing the passage by moving the rod outwardly by the said amount. Another prior art method comprises forming a small hole in the bottom portion of the container, filling high pressure gas through the hole, and closing the hole by utilizing a plug or welding.

In the former method, since the rod is inserted into the container by an additional amount exceeding the normal retracted position in filling gas into the container, it is required to fill gas under a pressure higher than the normal maximum pressure in the container by an amount corresponding to the volume of the piston rod of the aforementioned amount, thus it is expensive and dangerous. Further, it is required to attach a stopper or the like for preventing retracting movement of the rod exceeding normal maximum retracted position after the gas has been filled into the container so as to prevent forming the gas filling passage. The construction of the stopper or the like is complicated and which restrict the design of the container. Further, since the piston takes a position remote from the seal in filling the gas into the container it is required to dispose an additional stopper for preventing the inward movement of the seal which might close the gas filling passage inadvertently.

In the latter method manufacturing cost of the container increases by forming, closing and welding the small hole and, it has been difficult to check the weld thoroughly for preventing gas leakage therethrough.

Another object of the present invention is to overcome the aforementioned shortcomings in the prior art methods by forming passage means in the rod at a position adjacent to the inner end thereof, projecting the rod outwardly to the maximum extending position so as to form a gas filling passage through the passage means for communicating the inner and the outer sides of an annular seal ring which normally engages with the outer periphery of the rod sealingly and slidably, filling high pressure gas into the cylindrical container through the gas filling passage, and moving the rod inwardly relative to the annular seal so as to close the gas filling passage.

Some embodiments of the present invention will be explained in detail in conjunction with the accompanying drawings, in which:

FIG. 2 is a cross-sectional view of an improved gas spring according to the present invention and showing gas filling operation;

FIG. 3 is a view similar to FIG. 2 but showing a condition wherein the rod is moved inwardly relative to the seal ring;

Figure 1:
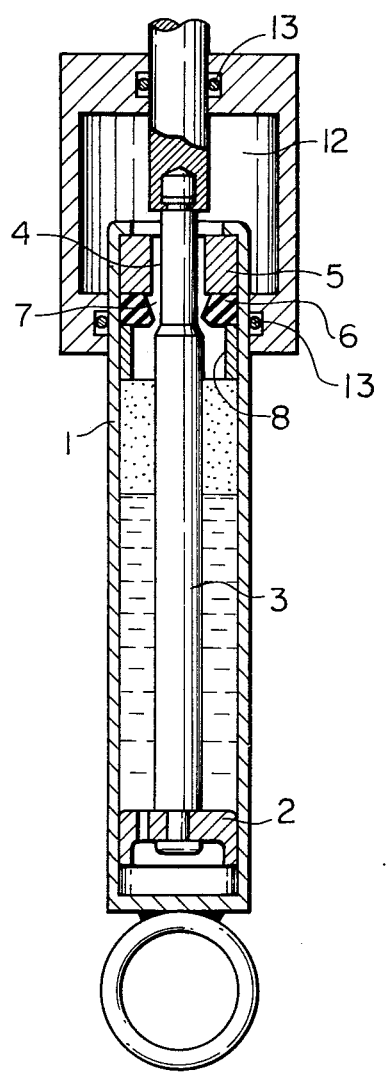
FIG. 1 is a cross-sectional view of a prior art gas spring.

In one prior art gas spring shown in FIG. 1, a reduced diameter portion 4 is formed in the upper end of a rod 3, and a piston 2 slidably disposed in a cylinder 1 is attached to the lower end of the rod 3. The rod 3 projects outwardly of the cylinder 1 through the upper open end thereof and through a seal ring 6 and a rod guide 5 which are retained in the upper end of the cylinder 1. When the piston 2 is moved to its maximum retracted position shown in the drawing a passage 7 is formed between the reduced diameter portion 4 and the seal ring 6 and the rod guide 5. By enclosing the upper end portion of the cylinder 1 with a suitable high pressure chamber 12, high pressure gas can be filled into the cylinder 1 through the passage 7. Thereafter, the rod 3 is moved outwardly by an amount sufficient to close the passage 7 with the seal ring 6 contacting the large diameter portion of the rod 3, and which position defines the normal maximum retracted position. A suitable device (not shown) is attached to the projecting portion of the rod 3 for preventing further retracting movement of the rod 3 over the normal retracted position.

Shown at numeral 8 is a stopper preventing inward movement of the seal ring 6 during the gas filling operation.

The gas spring shown in FIGS. 2 to 5 according to the present invention has a construction similar to FIG. 1 and corresponding parts are denoted by the same reference numerals.

In FIG. 2 showing a condition wherein a high pressure gas chamber 12 is attached to the upper end portion of the gas spring 1 sealingly by means of O-rings 13 for introducing high pressure gas into the gas spring 1 through a gas filling passage 7. The gas filling passage 7 is formed between a reduced diameter portion 4' formed in a rod 3 at a position adjacent to the inner end thereof and an annular seal ring 6. The rod 3 is positioned in its maximum extending position defined by the engagement of the piston 2 with a spacer ring 15 secured in the inner wall of the cylinder 1 by a projecting portion 14. In the drawing, the projecting portion 14 is shown as an annular projection formed by applying an axial force on the cylinder 1, but alternately, a plurality of angularly spaced projections may be formed by applying radial force on the cylinder 1. The annular seal ring 6 and a rod guide 5 are slidably disposed in the cylinder 1 and, in FIG. 2, they are displaced inwardly by an amount sufficient to form the gas filling passage 7 between the seal ring 6 and the reduced diameter portion 4'.

When the high pressure gas has been filled sufficiently into the cylinder 1, the rod 3 is moved inwardly so as to close the gas filling passage 7 by the large diameter portion of the rod 3 engaging with the seal ring 6, as shown in FIG. 3. At that time, the rod guide 5 and the seal ring 6 are retained in the position shown in FIG. 2 by the frictional engagement with the inner wall of the cylinder 1.

Figure 4:
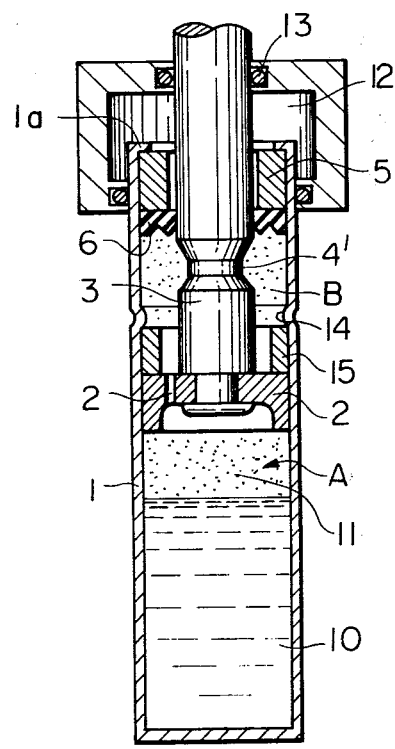
FIG. 4 is a view similar to FIGS. 2 and 3 but showing the final step of the gas filling operation.

Thereafter, the high pressure chamber 12 is released to the atmosphere, and the rod guide 5 and the seal ring 6 moves outwardly in the cylinder 1 by the pressure difference between the chamber 12 and the interior of the cylinder 1. The rod guide 5 abuts against a stopper 1a formed on the open end of the cylinder 1 as shown in FIG. 4. The piston 2 and the rod 3 may move to the maximum extending position as shown in FIG. 4, but the gas filling passage 7 is not formed and the seal ring 6 maintains the sealed condition.

Thereafter, the gas spring 1 is removed from the gas chamber 12.

Figure 5:
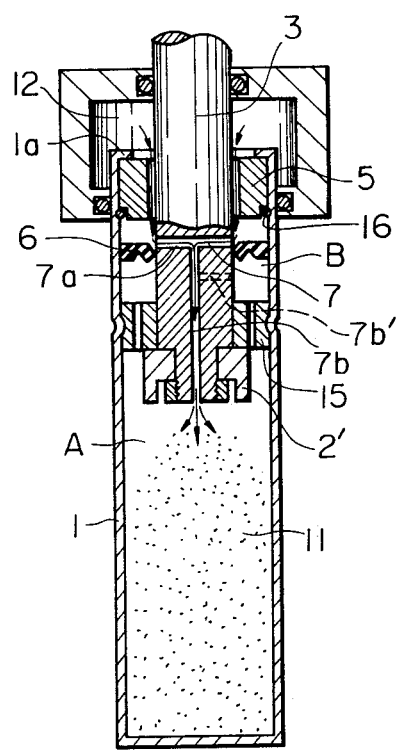
FIG. 5 is a view showing a modified form of the present invention.

FIG. 5 shows a modified form, in which, the rod guide 5 is secured to the cylinder 1 by a ring 16 and the deformed end 1a, and the annular seal ring 6 is located initially at a position spaced from the rod guide 5 as shown in the drawing. At that position and when the rod 3 takes the maximum extending position shown in the drawing, a gas filling passage 7 is formed across the seal ring 6 by a radial bore 7a and an axial bore 7b formed in the rod 3. The radial bore 7a opens on the upper side of the seal ring 6 and the axial bore 7b communicating with the radial bore 7a opens at the lowerside of the seal ring 6, thus, gas filling operation can be performed as explained in the first embodiment. In the embodiment, the inner end of the rod 3 is secured to a head 2' which does not slidably engage with the cylinder and abuts with a stopper 15 in the maximum extending position of the rod 3. The stopper 15 is retained in its position by angularly spaced projections 14 formed in the inner wall of the cylinder 1. The stopper 15 acts also to guide the sliding movement of the rod 3. In the embodiment, the bore 7b opens at the lower end of the rod 3, but the bore 7b may open at the position shown in the broken line 7b'.

As heretofore described, the method for filling gas into a cylindrical container having a rod slidably extending from one end of the container according to the present invention comprises the steps of forming passage means in the rod at a position adjacent to the inner end of the rod, projecting the rod outwardly from the cylinder to the maximum extending position thereby forming a gas filling passage communicating the inner and outer sides of an annular seal ring which normally engages the rod sealingly and slidably, filling high pressure gas into the cylindrical container through the gas filling passage and, thereafter, moving the rod inwardly relative to the seal ring so as to close the gas filling passage, thus, the pressure of the gas filled into the cylinder can be reduced as compared with the prior art methods and, leakage of the gas or the oil from the container can reliably prevented. Further it is possible to omit an additional stopper device on the exterior of the cylinder. Gas filling operation can be effected with an increased safety since the pressure of the gas being filled is lower than that of the prior art methods. Further, in the prior art method, a substantial axial force is required to apply on the rod in filling gas into the cylinder, while in the present invention the piston or the rod is retained in the maximum extending position by the pressure of the gas filled in the cylinder, thus it is possible to omit a rod retaining device.

Therefore, it is possible to fill a high pressure gas into a cylindrical container very simply, safely, reliably and economically.

What is claimed is:

1. A method for filling gas into a cylindrical container having a rod slidably extending from one end thereof comprising the steps of forming passage means in the rod at a position adjacent to the inner end thereof, projecting the rod outwardly from the cylinder to its maximum extending position thereby forming a gas filling passage, by said passage means, communicating the inner end and the outer sides of an annular seal member which normally engages the rod sealingly and slidably, filling high pressure gas through the gas filling passage into the container, and moving the rod inwardly relative to the seal member to close the gas filling passage.

2. A method for filling gas into a cylindrical container according to claim 1 in which said passage means comprises a reduced diameter portion of the rod adapted to form an annular gas filling passage between the inner periphery of the seal member when positioned in alignment with the seal member.

3. A method according to claim 1 in which said passage means comprises a passage formed in the rod and one end of which opens in the outer periphery of the rod and the other end of which opens to the interior of the container at a position spaced axially inwardly relative to the first opening.

4. A method according to claim 1 in which, the seal member is located initially at a position displaced inwardly from its normal position and is displaced outwardly by differential pressure between the inside and the outside of the container after the high pressure gas has been filled into the container thereby closing the gas filling passage.

5. A method according to claim 4 in which a rod guide is slidably disposed in the container to back up the seal member and the outward movement of the rod guide is restricted by a stopper formed at the outer end of the container.

6. A gas spring comprising a cylinder receiving a piston slidably therein, a rod secured to the piston and extending outside of the cylinder sealingly through an annular seal ring disposed at one end of the cylinder, a reduced diameter portion formed in the rod at a position adjacent to the piston, said reduced diameter portion is adapted to cooperate with the seal member to form a gas filling passage therebetween when the rod is positioned in an extending position, and means for preventing the outward movement of the rod relative to the seal member to prevent the outward movement of the rod relative to the seal member to seal the interior of the container permanently after the high pressure gas has been filled into the container and the rod is moved inwardly to close the gas filling passage.

* * * * *